US009050645B2

(12) United States Patent
Dubugnon

(10) Patent No.: US 9,050,645 B2
(45) Date of Patent: Jun. 9, 2015

(54) TOOL FOR MAKING JOINTS OF CLINCH TYPE

(75) Inventor: Olivier Dubugnon, Vullierens (CH)

(73) Assignee: ATTEXOR CLINCH SYSTEMS S.A., Ecublens (CH)

(*) Notice: Subject to any disclaimer, the term of this patent is extended or adjusted under 35 U.S.C. 154(b) by 909 days.

(21) Appl. No.: 13/001,445

(22) PCT Filed: Jun. 29, 2009

(86) PCT No.: PCT/EP2009/058110
§ 371 (c)(1),
(2), (4) Date: Mar. 30, 2011

(87) PCT Pub. No.: WO2009/156519
PCT Pub. Date: Dec. 30, 2009

(65) Prior Publication Data
US 2011/0258824 A1 Oct. 27, 2011

(30) Foreign Application Priority Data

Jun. 27, 2008 (EP) ..................................... 08159293

(51) Int. Cl.
*B23Q 1/00* (2006.01)
*B23P 11/00* (2006.01)
(Continued)

(52) U.S. Cl.
CPC ............ *B21D 39/031* (2013.01); *B21D 39/032* (2013.01); *B23P 19/062* (2013.01)

(58) Field of Classification Search
CPC .... B21D 39/00; B21D 39/031; B21D 39/032; B23P 19/062
USPC ............. 29/283.5, 243.5, 509; 81/120, 121.1, 81/124.2
See application file for complete search history.

(56) References Cited

U.S. PATENT DOCUMENTS 5,339,509 A * 8/1994 Sawdon et al. .................. 29/432
5,946,782 A * 9/1999 Dubugnon et al. ............ 29/21.1
(Continued)

FOREIGN PATENT DOCUMENTS

DE 102004033228 A1 2/2006
EP 1468758 A 10/2004
(Continued)

OTHER PUBLICATIONS

International Search Report and Written Opinion (mailed Aug. 14, 2009).
(Continued)

*Primary Examiner* — Lee D Wilson
*Assistant Examiner* — Seahee Yoon
(74) *Attorney, Agent, or Firm* — Jeffrey S. Melcher; Manelli Selter PLLC

(57) ABSTRACT

Tool for joining two or several sheet formed members, comprising two separate tool parts, a first tool-part with a punch and a second tool-part provided with a die which co-operate for producing said joint, the punch is arranged to be driven in a linear movement is in the direction of the co-axial die provided with a die cavity at the bottom of which an anvil is arranged, the die is further provided with movable die elements (108, 208, 208', 208'') arranged sliding laterally on a support surface (105) against the forces from a spring element (303, 303'), said die comprises at least two movable die elements (108, 208, 208', 208''), the die is provided with at least one support element (103, 203, 203', 203'') provided with an essentially horizontal support surface (110, 210) for said sheet formed members and said support elements (103, 203, 203', 203'') are not forming part of the sidewall (109) of the die opening in its initial closed position.

12 Claims, 15 Drawing Sheets

(51) Int. Cl.
*B25B 13/06* (2006.01)
*B25B 13/02* (2006.01)
*B25B 13/00* (2006.01)
*B21D 39/03* (2006.01)
*B23P 19/06* (2006.01)

(56) References Cited

U.S. PATENT DOCUMENTS

2006/0096076 A1* 5/2006 Rapp .................... 29/525.06
2006/0168792 A1   8/2006 Reatherford
2006/0196034 A1   9/2006 Sawdon
2006/0243013 A1  11/2006 Zdravkovic

FOREIGN PATENT DOCUMENTS

WO    9702912      1/1997
WO    03084694 A  10/2003

OTHER PUBLICATIONS

European Communication dated Mar. 4, 2011 (relating to the corresponding European application).
Written Opinion issued in international PCT application No. PCT/EP2009/058110, Aug. 14, 2009, pp. 1-6.
European Search Report issued in European patent applicaiton No. 08159293.3-2302, Nov. 27, 2008, pp. 1-7.
International Search Report issued in international PCT application No. PCT/EP2009/058110, Aug. 14, 2009, pp. 1-3.

* cited by examiner

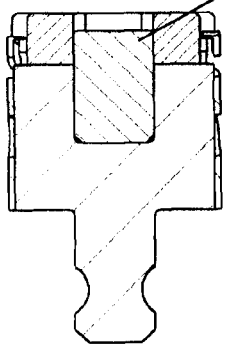
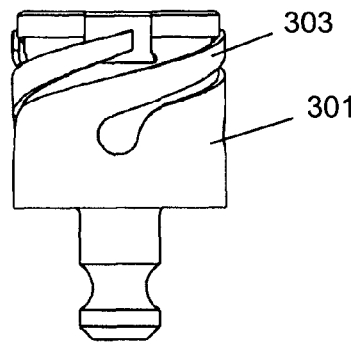
FIG 4C  FIG 4B
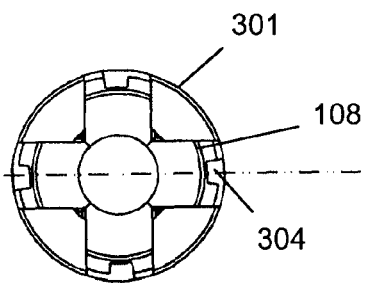
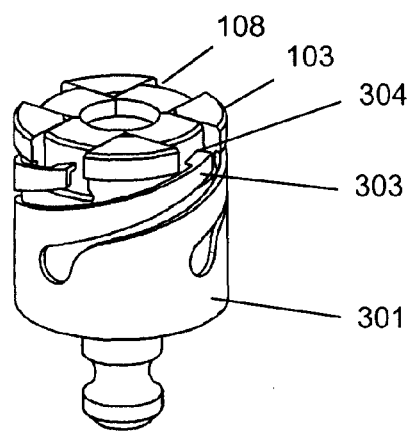
FIG 4D  FIG 4A

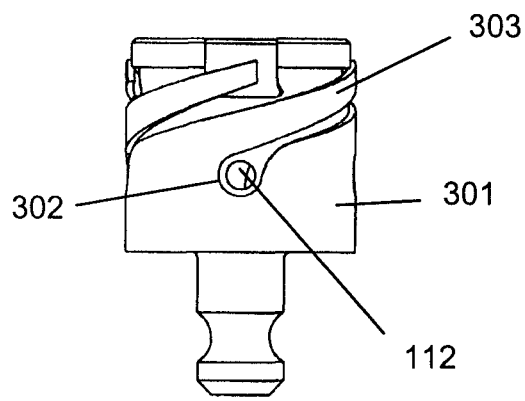
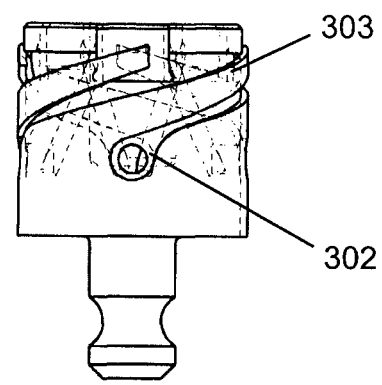
FIG 6C
FIG 6B
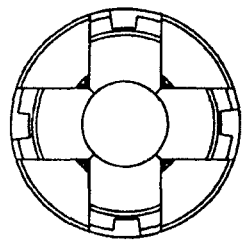
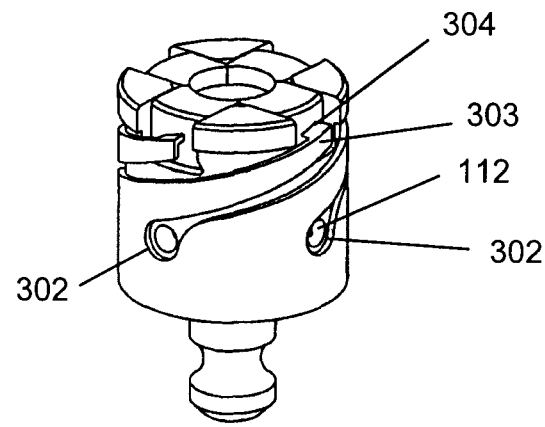
FIG 6D
FIG 6A

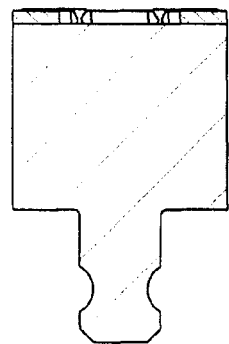
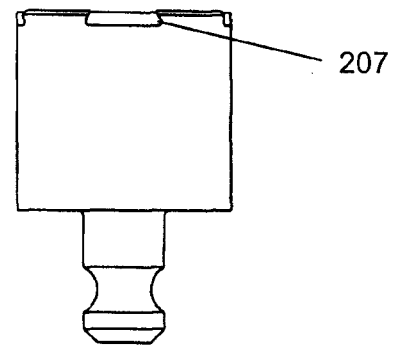
FIG 9C  FIG 9B
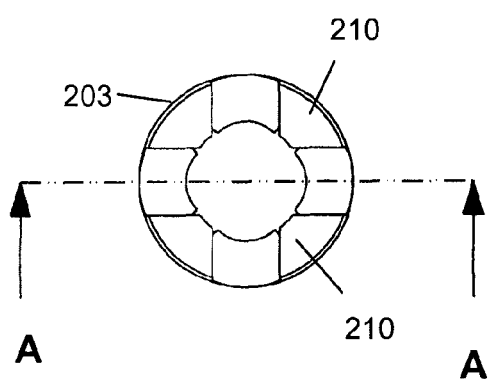
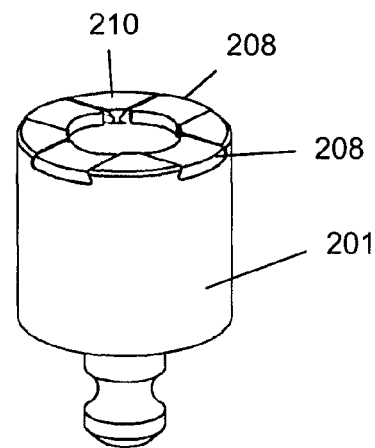
FIG 9D  FIG 9A

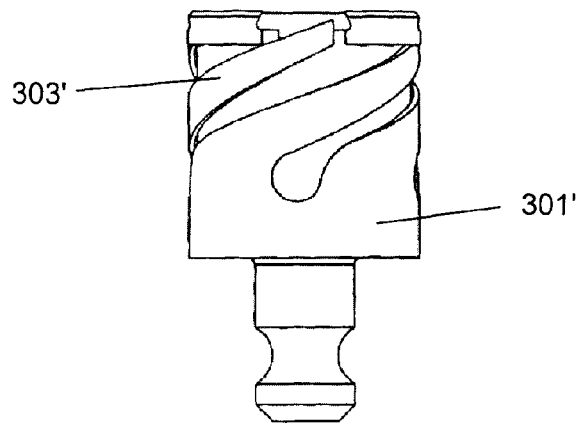
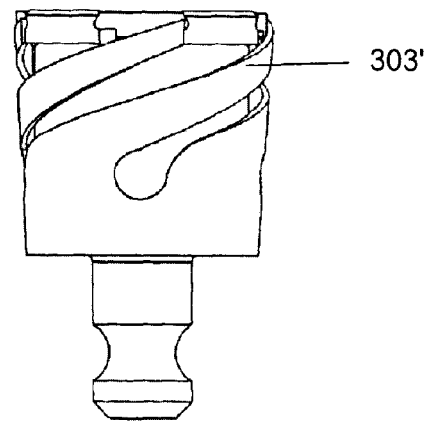
FIG 12 D                FIG 12C
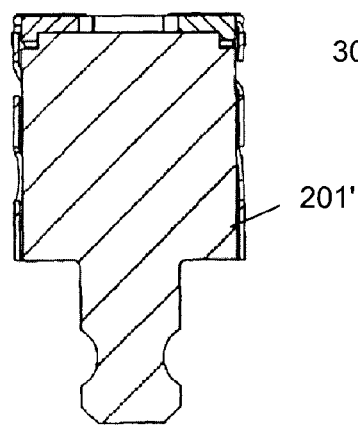
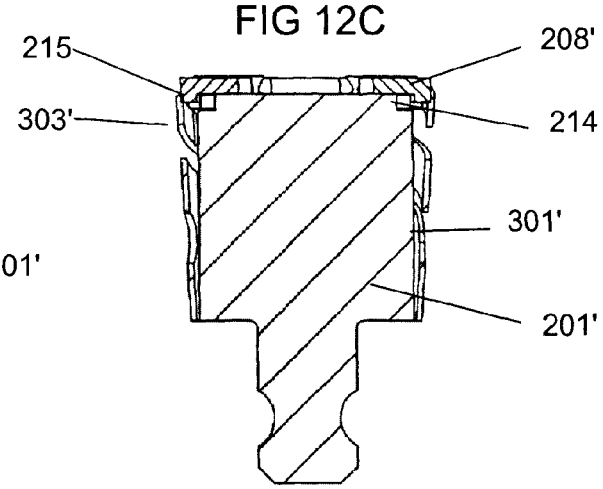
FIG 12E                FIG 12B
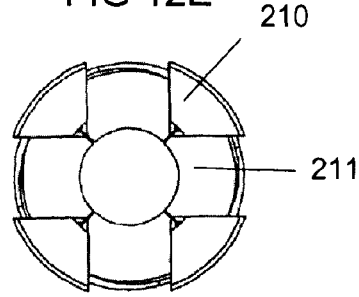
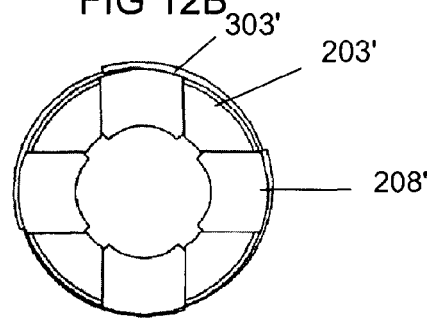
FIG 12F                FIG 12A

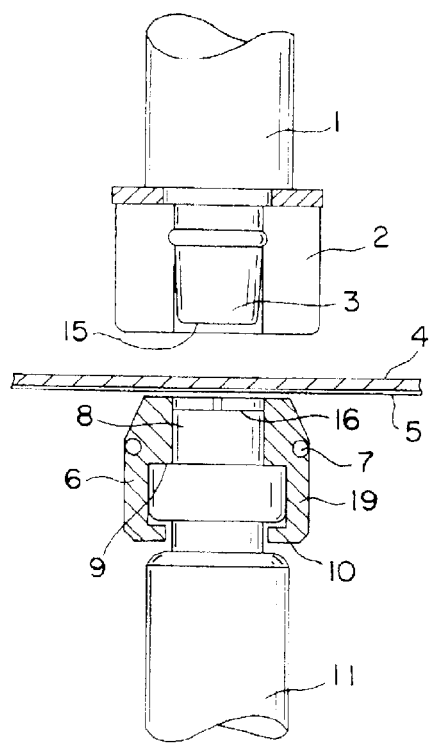 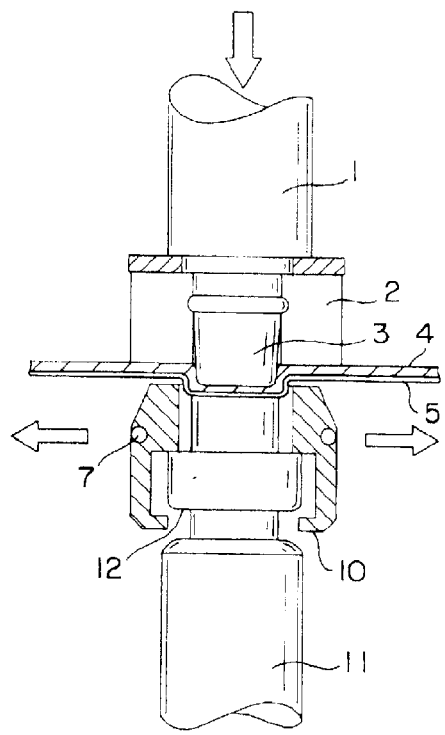
Fig. 14A
Prior Art
Fig. 14B
Prior Art

TOOL FOR MAKING JOINTS OF CLINCH TYPE

CROSS-REFERENCE TO RELATED APPLICATIONS

This application is a national stage entry under 35 U.S.C. 371 of International Application No. PCT/SE2009/058110, filed 29 Jun. 2009, designating the United States. This application claims foreign priority under 35 U.S.C. 119 and 365 to Swedish Patent Application No. 08159293.3, filed 27 Jun. 2008. The complete contents of these applications are incorporated herein by reference.

TECHNICAL FIELD

The present invention relates to a tool for making joints of the so called clinch type between two or several sheet formed members of metal or non-metal.

BACKGROUND ART

This technique is well known in the art. A suitable tool comprises generally two separate tool parts which co-operate for producing said joint. A first tool part has the form of a punch which in a linear movement is driven in the direction of a co-axial second tool part in the form of a die with a die cavity at the bottom of which an anvil is arranged.

For making the joint the sheet formed members are positioned against the second tool part, the die, provided with movable die elements arranged sliding laterally on a support surface against the forces from a spring element. The spring element is generally constituted by a ring made of an elastomer or a toroid formed metal spring surrounding the movable die elements.

The approaching punch impacts on the surface of one of the members to be joined. The material of the two members is first drawn into the die cavity and subsequently due to the interaction between the punch and the anvil at the bottom of the cavity laterally extruded thereby displacing the movable die elements outwardly creating in the sheet formed members a mushroom formed button which interlocks the members.

U.S. Pat. No. 5,946,782, issued 7 Sep. 1999 discloses a conventional tool for making joints between sheet-formed member. FIGS. 14A and B, Prior Art, show a tool for making joints between sheet-formed members (4, 5) comprising a first tool-part (1, 2, 3) with a punch (1) and a side pressing element (sleeve) (2) and a second tool-part (6,11) provided with a support surface (9) from which an anvil (8) erects, a matrix comprising at least two matrix-parts (6) each having an upper active matrix surface and being arranged around said anvil (8). The matrix parts are surrounding an anvil (8) having a generally flat top surface (16). Each matrix part comprises a portion arranged sliding against said support surface (9) and being applied against the lateral surface of said anvil (8) by means of elastic means (7). Retention means (10) are arranged limiting the longitudinal movement of the matrix parts during the retraction of the punch (1) by engaging surface (12). The upper active matrix surface, the portion arranged sliding against said support surface (9) and said retention means (10) are arranged in that order from the top of the second tool-part (6, 11). A generally flat horizontal surface (15) of the punch will be brought into contact with the upper sheet formed member (4) when the punch is approaching the matrix-anvil part of the tool. The sheet formed members rest on the top surface of four identical matrix parts (6) forming the matrix. These matrix parts are surrounding an anvil (8) having a generally flat top surface. The matrix parts are held together by means of a resilient means (7) arranged in a grove on the surface of the matrix parts between the top surface and the inner sliding surface on the respective matrix part. A generally flat and horizontal co-operating sliding surface (9) is arranged on the anvil body (11) forming the top surface of a ring-formed element on said body. Side wall elements (19) are linking the upper part of the matrix element with an inner flange at the lower part of the element. This flange is extending inwardly, laterally around the lower part of said ring formed element thereby gripping around the same and preventing the dislocation of the matrix during the returning movement of the punch.

One of the problems with this type of it joint is to achieve sufficient strength against both shear forces and peeling forces. A number of tools exist which are more or less efficient when it comes to producing acceptable joints.

BRIEF DESCRIPTION OF THE INVENTION

The invention is related to a complete tool with a punch-die combination, a separate die and a special form of the spring element used in this type of tool. In the following the main part of the description will be attributed to the special characteristics of the die and the spring element.

The punch could be of the conventional type on which the active free end has a cylindrical form, but other forms could be envisaged as well, e.g. slightly conical forms.

One of the objects of the present invention is to provide a very robust and wear resistant tool. A tool according to the invention is possible to realise with very small dimensions especially in the embodiment with only two movable die elements which makes it suitable for use in narrow environments.

A further object of the invention is to provide a die element on which the movable die elements are very precisely and efficiently guided in their reciprocating movement at the same time as they are efficiently locked against vertical movement. Vertical forces are applied on the die elements at the end of the procedure when the punch and the joint are retracted from the die cavity.

A still further object of the invention is to provide a new type of spring element which has decisive advantages over spring elements known in the prior art.

With the support surfaces close to the centre of the die unwanted deformations of the sheet formed members especially the one in contact with the support surfaces will be kept at a minimum. Additional extruded material will therefore instead go into the mushroom formed button which will increase the strength of the joint. This is especially true when the clamping device used with this kind of tool acting on the sheet formed members from the same side as the punch, having the form of a sleeve surrounding the punch, has been given a contact surface in a form corresponding to the top surface of the support elements. Additional increase of this effect will be reached by treating the top surface of the support elements to give higher friction against the sheet formed member in contact with the same.

The present invention, which provides a solution to the said technical problems, is characterised according to the appended claims.

BRIEF DESCRIPTION OF THE FIGURES

Other objects and advantages of this invention will be apparent from the reading of this description which proceeds with reference to the accompanying drawings forming part thereof and wherein:

FIGS. 4A-D show in different views the first embodiment of the second tool part according to the invention including the movable die elements in the closed position and additionally provided with a spring element according to the invention, FIGS. 6A-D show in different views the first embodiment of the second tool part according to the invention including the movable die elements in the closed position and additionally provided with a spring element according to the invention and air channels in the body of the tool part, FIGS. 9A-D show in different views the second embodiment of the second tool part according to the invention including the movable die elements in the open position.

FIGS. 14A and B [Prior Art] show a conventional movable die.

DETAILED DESCRIPTION OF THE INVENTION

Figure 1C:
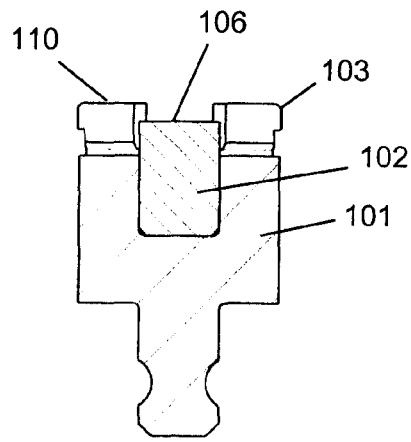
FIGS. 1A-D show in different views a first embodiment of the second tool part according to the invention without the movable die elements.
Figure 1B:
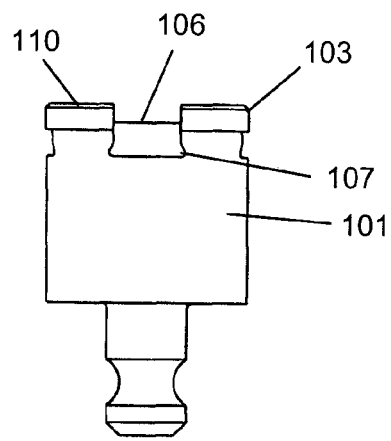
Figure 1D:
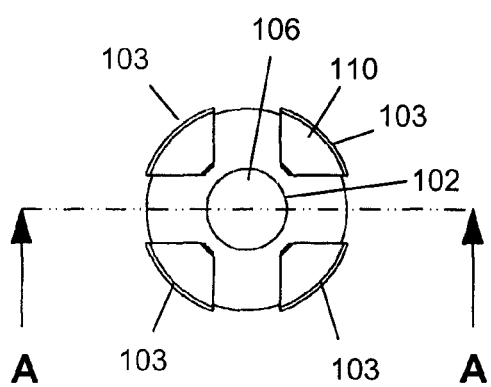
Figure 1A:
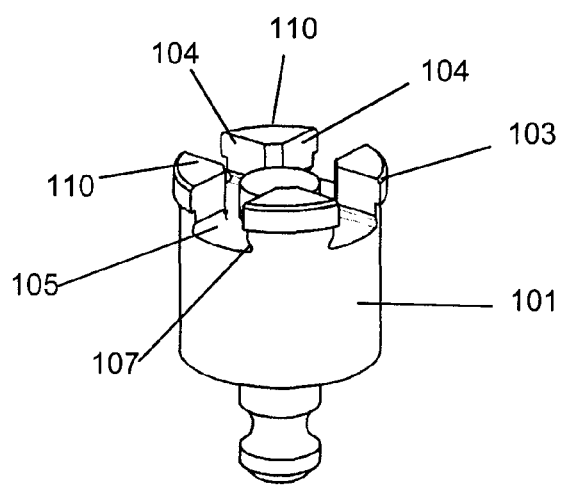
Figure 2C:
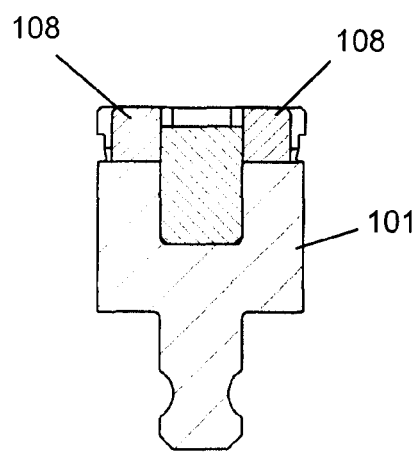
FIGS. 2A-D show in different views the first embodiment of the second tool part according to the invention including the movable die elements in the closed position.
Figure 2B:
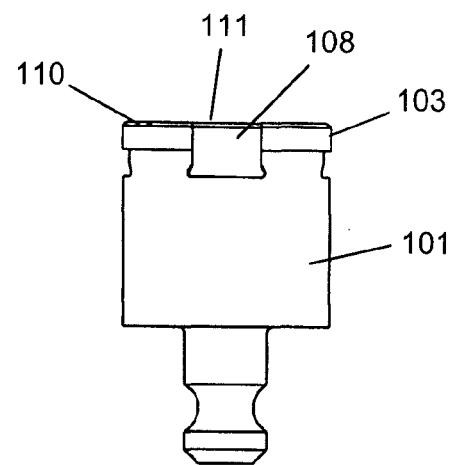
Figure 2D:
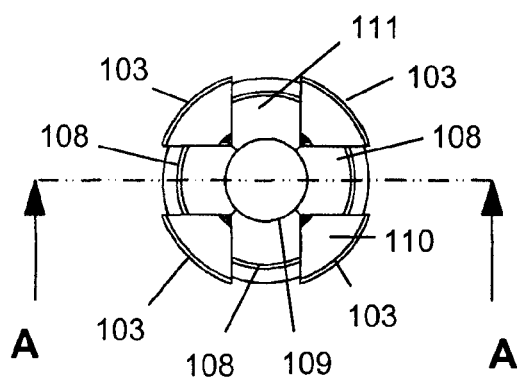
Figure 2A:
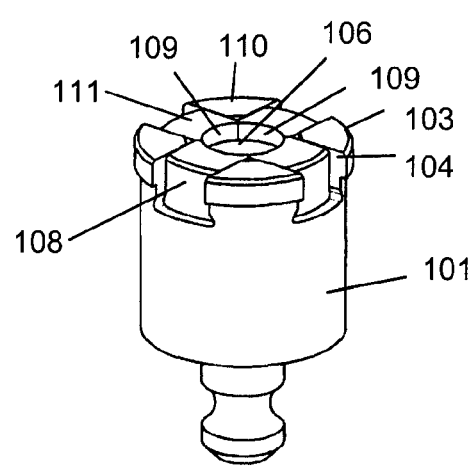
Figure 3C:
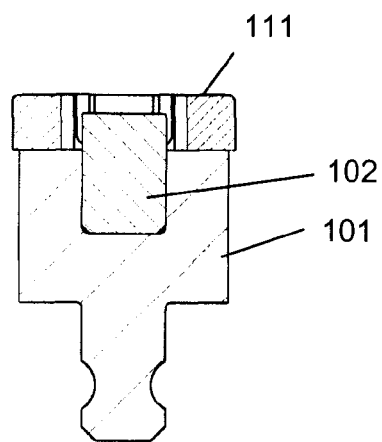
FIGS. 3A-D show in different views the first embodiment of the second tool part according to the invention including the movable die elements in the open position.
Figure 3B:
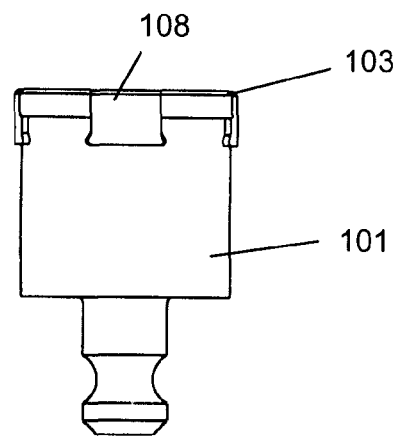
Figure 3D:
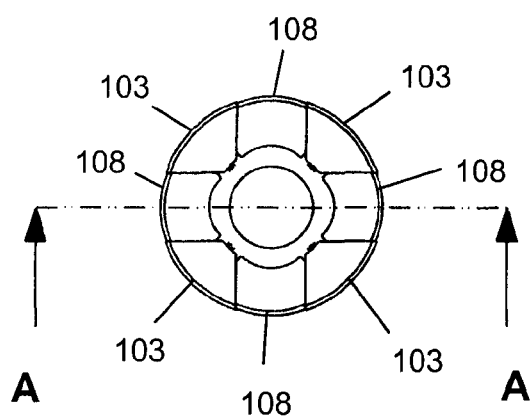
Figure 3A:
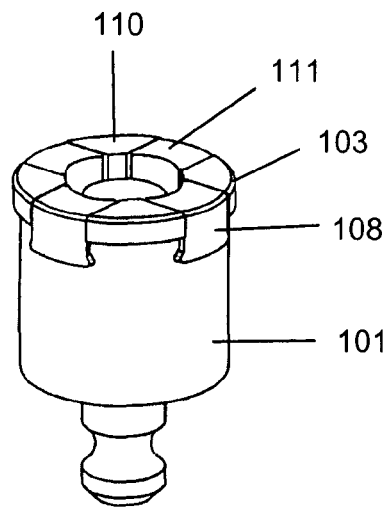

FIGS. 1A-D show in different views a first embodiment of the second tool part according to the invention without the movable die elements 108, cf. for instance FIG. 2A. FIG. 1A shows the tool part in a perspective view. The tool part body 101 carries on its upper surface in this embodiment four support elements 103 arranged on one hand to support, by means of their upper surfaces 110, the sheet formed members (not shown) to be joined together during the joining process, and on the other hand to support and guide the movable die elements 108 in their lateral movement. The four support elements 103 are in this embodiment arranged symmetrically around, and at a certain distance from, an anvil 102 having an upper generally flat surface 106. The space between the support elements 103 has been given a form such that it in co-operation with the form of the movable die elements 108 will block the vertical movement of the elements 108, i.e. in the direction parallel to the axis of the tool part 101. The side walls 104 of the support elements 103 are generally flat and parallel to the same axis and are stabilising and guiding the movable elements in their lateral movement. The vertical blocking can be achieved by giving the elements 108 a somewhat larger section at their lower part which co-operates with a corresponding grove 107 at the lower part of the space between the support elements 103. The horizontal generally flat surface 105 supports the sliding movement of the elements 108.

FIG. 1B shows a side view of the same embodiment. The form of the grove 107 is here clearly visible. However, it should be noted that the arrangement for the vertical blocking could be realised in other ways, e.g. by means of a classical dovetailed grove. The grove could alternatively be arranged in the movable element 108 co-operating with a rim arranged on the sidewall 104, etc.

FIG. 1C shows a section through the tool part 101 along the line A-A of FIG. 1D. The anvil 102 is here represented as a separate part inserted in a dead-end hole at the centre of the tool part 101. This arrangement makes it easy to change the anvil and adjust the depth of the die cavity depending on e.g. the thickness of the sheet formed members to be joined.

Further below a second embodiment will be described in detail but it should be mentioned that the inventive idea could be realised on tool parts having at least two movable elements 108.

FIGS. 2A-D show in different views the first embodiment of the second tool part according to the invention including the movable die elements 108 in the initial closed position. This is the position at the start of a joining procedure. The die elements 108 are kept in position by means of some spring element, an example of which will be described more in detail below. It should be noted, however, that traditional spring elements like elastomeric spring sleeves and toroid formed metal springs could be used.

As can be seen in FIGS. 2A and 2D the die cavity has a generally cylindrical form defined by the upper generally flat surface 106 on the anvil and the side walls 109 of the four die elements 108. The sidewalls 109 are here illustrated as vertical but could in other embodiments have a somewhat conical form creating a die cavity with different diameters at the top and the bottom.

As mentioned the sheet formed members (not shown) to be joined together are supported by the upper surfaces 110 on the support elements 103 during the joining process. The vertical forces on the tool part will, during the formation of the joint, be considerable. In order to facilitate the sliding lateral movement of the elements 108 which take place during the formation of the joint the vertical dimension of the elements 108 could advantageously be chosen so that the upper generally flat surface 111 of the elements 108 will be somewhat lower than the upper surface 110 on the support elements 103.

FIGS. 3A-D show in different views the first embodiment of the second tool part according to the invention including the movable die elements 108 in the open position. The elements 108 are retained in place by means of the spring means e.g. of the type shown in the FIGS. 4 and 6. It should be noted that the joining procedure not necessarily open the die cavity as much as shown in FIG. 3 and could be finalized before the deformed material in the joint touches the support elements 103.

Experiments have shown that an efficient clamping of the sheet formed members as close as possible to the centre of the joint will contribute to greater strength of the joint. Therefore, the form of the support elements according to the invention is very advantageous. In order to minimise the sliding of the material over the surface 110 this surface could be treated to give enhanced friction.

FIGS. 4A-D show in different views the first embodiment of the second tool part according to the invention including the movable die elements 108 in the closed position and additionally provided with a spring element 301 according to the invention. The element 301 has the general form of a cylindrical cage the surface of which has been provided with four slots having an acute angle, not necessarily constant, relative the axis of the cage to form four long elastic arms or blades 303 equally partitioned around the circumference with their free ends at the upper edge of the cage. The free end of each blade 303 is in this embodiment provided with a bent flange 304 arranged to bear against the movable element 108 to transfer the spring force to said element. It is understood that the bent flange 304 or another means for transferring the spring force is not always necessary. The inner diameter of the cage corresponds to the outer diameter of the tool part body 101 and the positioning of the cage is made by sliding the cage over the tool part body. The cage is made of some suitable resilient material such as spring steel and the material the form and length of the blades are chosen to give the appropriate spring force for the movable elements 108. The spring element according to the invention is very compact, easy to change and has excellent properties.

Figure 5C:
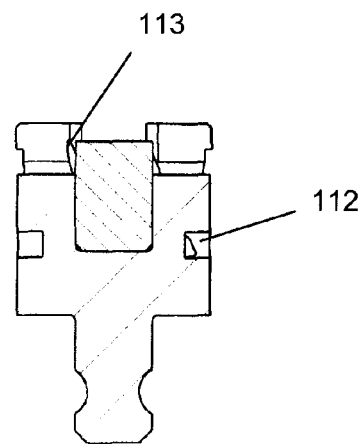
FIGS. 5A-D show in different views the embodiment according to FIGS. 1A-D additionally provided with air channels in the body of the tool part.
Figure 5B:
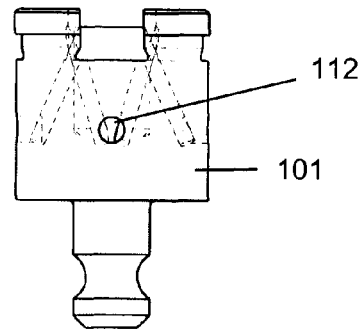
Figure 5D:
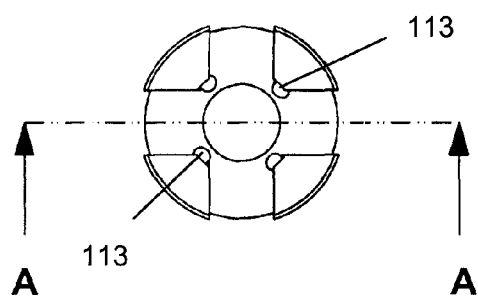
Figure 5A:
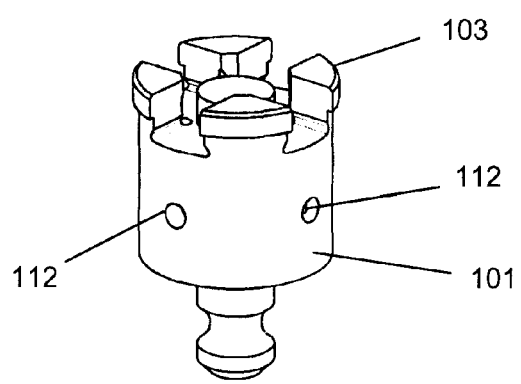

FIGS. 5A-D show in different views the embodiment according to FIGS. 1A-D additionally provided with channels 112 for compressed air in the body of the tool part 101. FIGS. 5C and 5D show advantageous positions of the outlets 113 from the channels.

FIGS. 6A-D show in different views the first embodiment of the second tool part according to the invention including the movable die elements 108 in the closed position and additionally provided with a spring element 303 according to the invention and air channels 112 in the body of the tool part 101. The lower end portion 302 of the slots has been given a form to leave the openings of the air channels 112 free.

Figure 7C:
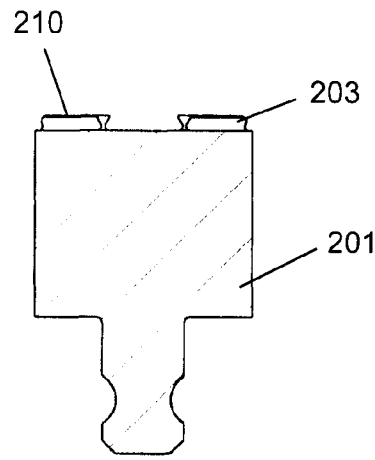
FIGS. 7A-D show in different views a second embodiment of the second tool part according to the invention without the movable die elements.
Figure 7B:
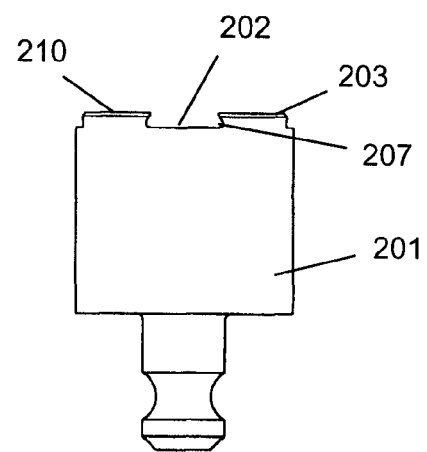
Figure 7D:
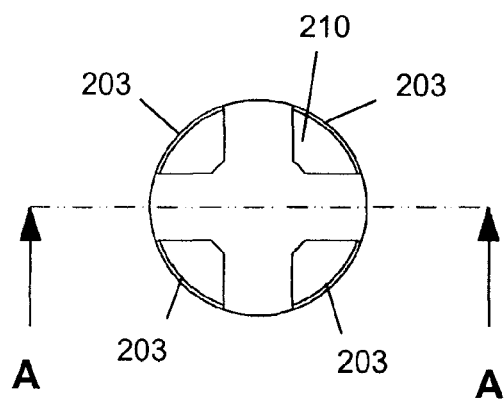
Figure 7A:
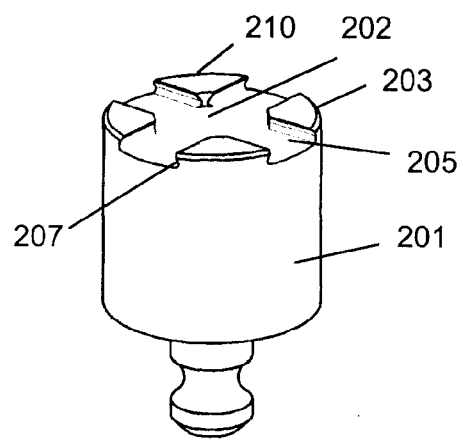

FIGS. 7A-D show in different views a second embodiment of the second tool part according to the invention without the movable die elements. FIG. 7A shows the tool part in a perspective view. The tool part body 201 carries on its upper surface in this embodiment four support elements 203 arranged on one hand to support, by means of their upper surfaces 210, the sheet formed members (not shown) to be joined together during the joining process, and on the other hand to support and guide the movable die elements 208 in their lateral movement.

The four support elements 203 are in this embodiment arranged symmetrically along the circumference of the tool part body 201 and are protruding from a generally flat surface which at the same time in its central part constitutes the anvil 202 and the surface 205 on which the movable elements are displaced. The space between the support elements 203 has in this embodiment too been given a form such that it in co-operation with the form of the movable die elements 208, cf. FIG. 8, will block the vertical movement of the elements 208, i.e. in the direction parallel to the axis of the tool part 201. The vertical blocking is achieved by giving the elements 208 a somewhat larger section at their lower part which co-operates with a corresponding grove 207 at the lower part of the space between the support elements 203. The horizontal generally flat surface 205 supports the sliding movement of the elements 208.

FIG. 7B shows a side view of the same embodiment. Alternative arrangements for the vertical blocking could be realised in the same ways as for the first embodiment.

FIGS. 8A-D show in different views the second embodiment of the second tool part according to the invention including the movable die elements 208 in the initial closed position. This is the position at the start of a joining procedure. The die elements 208 are kept in position by means of some spring element, an example of which has been described above. It should be noted, however, that traditional spring elements like spring sleeves of for instance elastomeric material and toroid formed metal springs could be used.

Figure 8C:
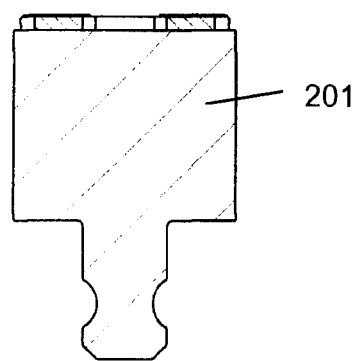
FIGS. 8A-D show in different views the second embodiment of the second tool part according to the invention including the movable die elements in the closed position.
Figure 8B:
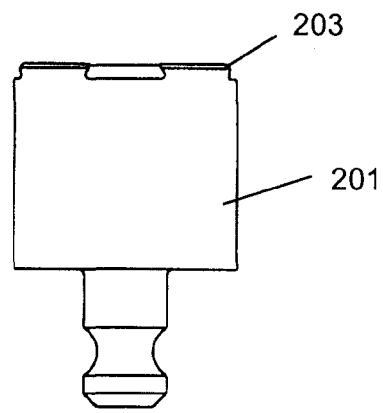
Figure 8D:
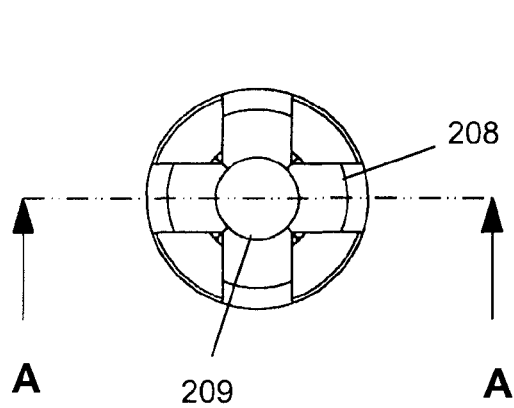
Figure 8A:
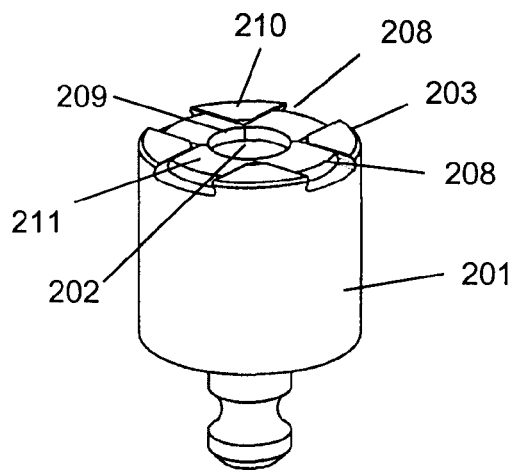

As can be seen in FIGS. 8A and 8D the die cavity has a generally cylindrical form defined by the generally flat surface 202 on the anvil and the side walls 209 of the four die elements 208. The sidewalls 209 are here illustrated as vertical but could in other embodiments have a somewhat conical form creating a die cavity with different diameters at the top and the bottom.

As mentioned the sheet formed members (not shown) to be joined together are supported by the upper surfaces 210 on the support elements 203 during the joining process. The vertical forces on the tool part will, during the formation of the joint, be considerable. In order to facilitate the sliding lateral movement of the elements 208 which take place during the formation of the joint the vertical dimension of the elements 208 could advantageously be chosen so that the upper generally flat surface 211 of the elements 208 will be somewhat lower than the upper surface 210 on the support elements 203.

In order to make sure that the die cavity forms properly and centered in the starting position, i.e. the closed position as illustrated in FIG. 8, the displacement of the movable die elements 208 in the direction of the center of the tool part 201 could be limited by means of an end stop. Such an end stop could e.g. be implemented by an expanded rear portion of the element 208 in co-operation with a corresponding arrangement of the width of the guiding channel between the support elements 203. An example of this type of end stop is illustrated in FIGS. 13 A-F, cf. below.

In the first embodiment described above the protruding anvil 102 also forms the end stop for the movable die elements 108 in the direction of the center of the tool part 101.

In some embodiments you would also wish to arrange an end stop for the movable die elements in their movement out from the centre of the respective tool part 101, 201 taking place during the lateral expansion of the compressed material. One way of achieving both types of end stops could be to arrange a pin or a screw (not shown) vertically through the movable die element reaching into a co-operating elongated groove (not shown) arranged in the sliding surface 105, 205.

In some embodiments the outward movement of the die elements 108, 208 will be stopped before the expanded material contacts the support elements 103, 203.

FIGS. 9A-D show in different views the second embodiment of the second tool part according to the invention including the movable die elements 208 in the open position. The elements 208 are retained in place by means of the spring means e.g. of the type shown in the FIGS. 4 and 6. It should be noted that the joining procedure not necessarily open the die cavity as much as shown in FIG. 9 and could be finalized before the deformed material in the joint touches the support elements 203.

Experiments have shown that an efficient clamping of the sheet formed members as close as possible to the centre of the joint will contribute to greater strength of the joint. Therefore, the form of the support elements according to the invention is very advantageous. In order to minimise the sliding of the material over the surface 210 this surface could be treated to give enhanced friction.

FIGS. 10A-D show in different views the embodiment according to FIGS. 7A-D additionally provided with channels 212 for compressed air in the body of the tool part 201.

Figure 10C:
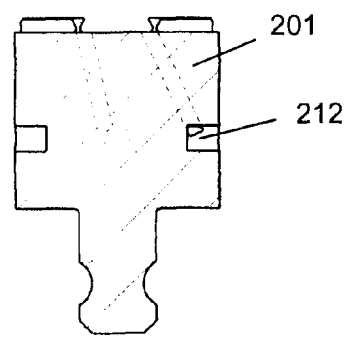
FIGS. 10A-D show in different views the embodiment according to FIGS. 7A-D additionally provided with air channels in the body of the tool part.
Figure 10B:
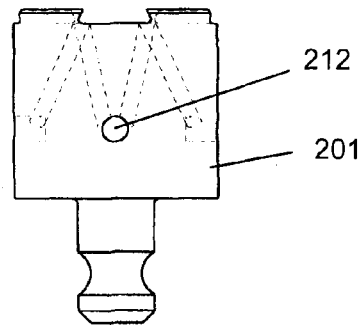
Figure 10D:
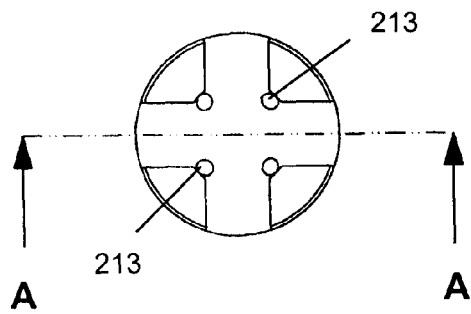
Figure 10A:
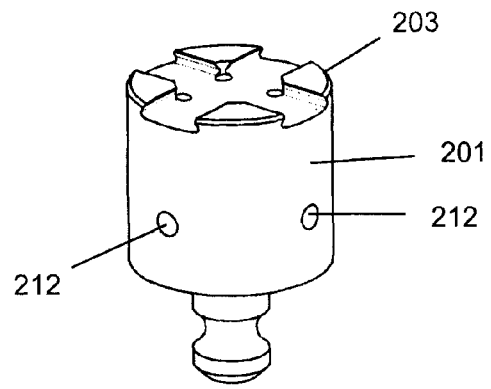
Figure 11D:
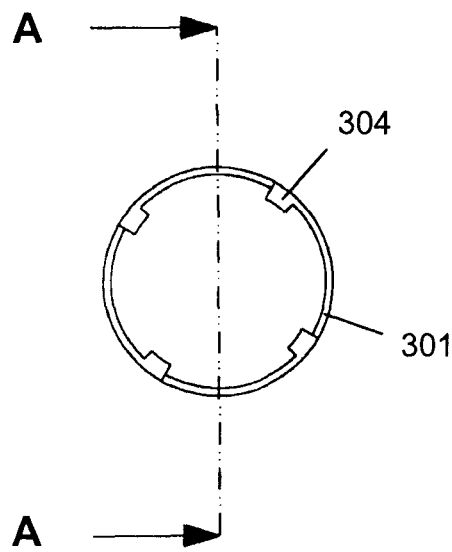
FIG. 11A-D show in different views said spring element separately, FIG. 12 A-F show an embodiment according to which the movable die elements have been provided with an end stop in the form of a heel formed element at the rear end of the of the movable die elements, FIG. 13 A-F show an embodiment according to which the movable die elements have been provided with an end stop in the form of an expanded rear portion of the element.
Figure 11C:
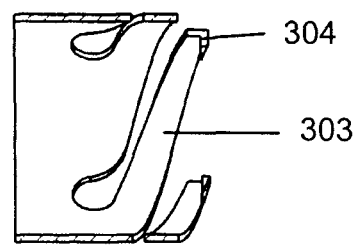
Figure 11B:
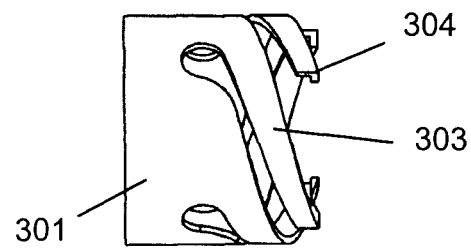
Figure 11A:
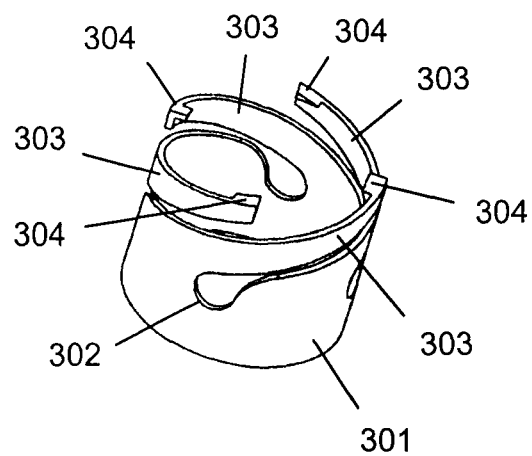
Figure 13D:
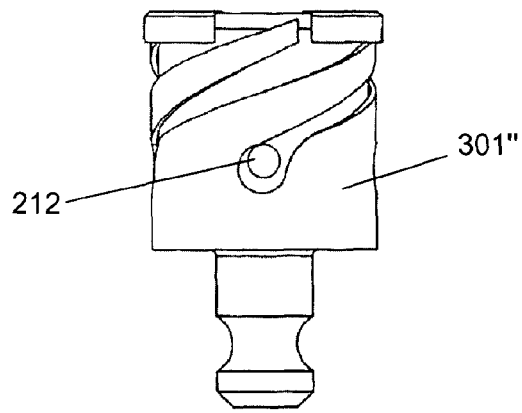
Figure 13C:
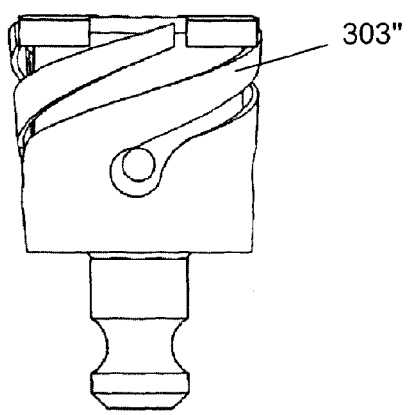
Figure 13E:
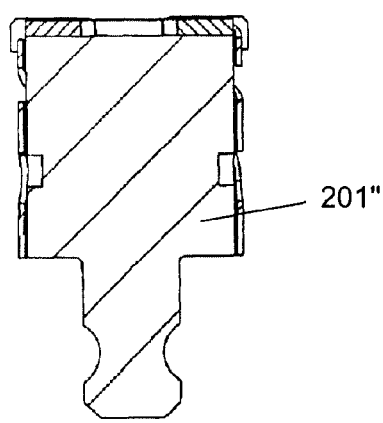
Figure 13B:
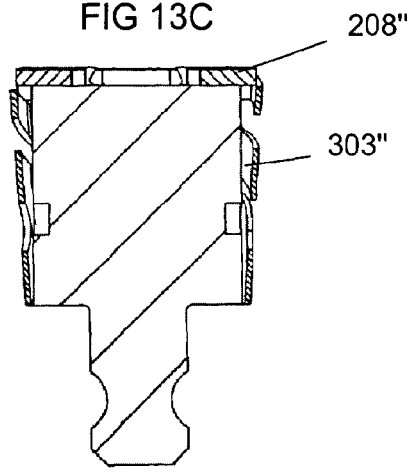
Figure 13F:
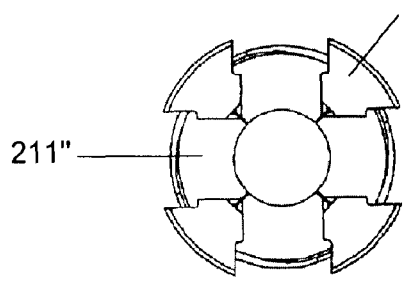
Figure 13A:
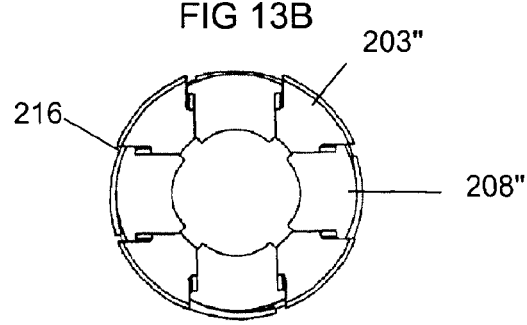

FIGS. 10C and 10D show advantageous positions of the outlets 213 from the channels.

FIG. 11A-D show in different views said spring element separately. This element has been described in detail in relation to FIGS. 4A-D.

FIG. 12 A-F show an embodiment according to which the movable die elements 208' have been provided with an end stop in the form of a vertical heel formed element 215 at the rear end of the elements. The heel element 215 could reach along the full width of the element 208' or part of the width. As can be seen, especially in FIG. 12B the heel element is co-operating with a corresponding recess 214 in the tool part body 201'. The FIGS. 12A-C show the die-anvil combination in its open position and the FIGS. 12D-F in its closed position. It could also be noted that the spring element 301' in this case has arms 303' without a bent flange 304. This is as described above an option.

FIG. 13 A-F show an embodiment according to which the movable die elements 208" have been provided with an end stop in the form of an laterally expanded rear portion 216 of the element. The FIGS. 13A-C show the die-anvil combination in its open position and the FIGS. 13D-F in its closed position. In this embodiment the side walls of the support elements 203" have been arranged with a suitable recess co-operating with the enlarged rear portion of the movable elements. In principle it would be sufficient to arrange the expanded portion 216 only at one side of the movable element. In order to assure the best possible guiding of the elements 208" double sided enlargements are however preferred. In FIG. 13F is illustrated how the support surfaces 210" have been changed in relation to the surfaces 210. The top surface 211" of the elements 208" has in this embodiment also a different form compared to the surface 211.

Figure 14C:
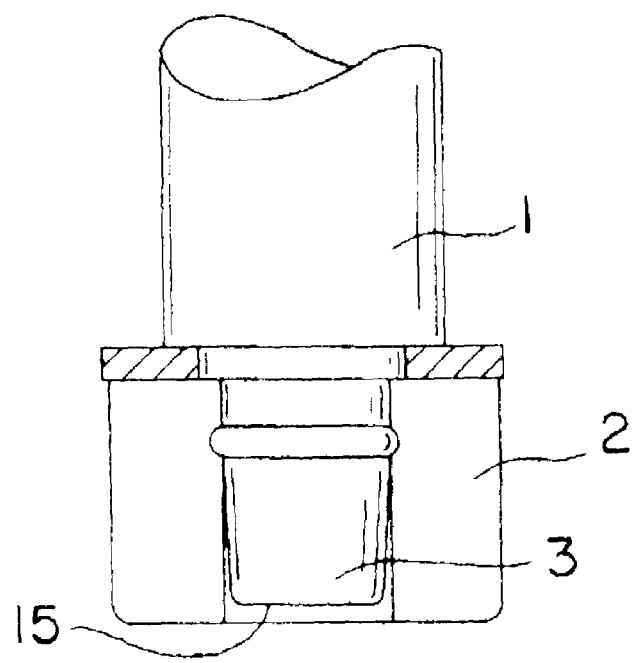
FIG. 14C shows a punch.

As shown in FIG. 14C, the first tool part (1, 2, 3) comprises a punch (1) and a sleeve (2) arranged around a tip portion (3). The punch (1) comprises a generally flat surface (15).

The invention claimed is:

1. A tool for joining two or several sheet formed members by a clinch-type joint, comprising
   two separate first and second tool parts, arranged co-axially,
      the first tool-part comprising a punch surrounded by a sleeve, and
      the second tool-part comprising a die, wherein the first and second tool-parts co-operate for producing a joint between sheet formed members by driving the punch in a direction of the die, the die is provided with a central die cavity, an anvil is arranged within the central die cavity at a bottom of the die, the die is provided with at least two movable die elements arranged sliding laterally in a plane perpendicular to the central die cavity on a support surface of the second tool-part against forces from a spring element, the second tool-part is provided with at least two support elements separated from each other for said sheet formed members to be joined arranged in a circumferential direction around said die cavity to provide support at separated distinct areas of a lower side of the sheet formed member closest to the die and each support element being provided with an upper essentially horizontal support surface, and wherein said movable die elements are each arranged between two of the support elements and are guided in a radial movement in a direction of the center of the die cavity and are additionally blocked for vertical movement, for both movements by means of co-operating arrangements of respective essentially vertical side walls of the movable die elements and the essentially vertical side walls of the in the circumferential direction foregoing and following support elements, wherein an upper generally flat surface of the anvil is constituted by part of the support surface on which the movable die elements are displaced and the support elements are protruding from said upper generally flat surface and are symmetrically arranged along the circumference of the second tool part.

2. The tool according to claim 1, wherein said upper essentially horizontal support surface of said support elements has a tapered form in the direction of the die cavity with its narrow end in the vicinity of the die cavity when the number of said support elements is greater or equal to three.

3. The tool according to claim 1, wherein the sleeve surrounding the punch has a contact surface corresponding to the top surface of the support elements.

4. The tool according to claim 1, wherein the upper surface of said support elements has been treated to give increased friction against the sheet formed member in contact with the same.

5. The tool according to claim 1, wherein said movable die elements have been provided with an end stop limiting the inward lateral movement.

6. The tool according to claim 1, wherein said end stop has the form of a vertical heel formed element at the rear end of movable element co-operating with a corresponding recess in the tool part body.

7. The tool according to claim 1, wherein said blocking of the vertical movement is achieved by giving said movable die elements a somewhat larger section at their lower part which co-operates with a corresponding groove at the lower part of the space between the support elements.

8. The tool according to claim 1, wherein the dimensions of the movable die elements are such that the upper generally flat surface of said movable die element is somewhat lower than the upper surface of the support elements.

9. The tool according to claim 5, wherein said end stop has the form of a laterally expanded rear end portion of the movable element co-operating with a corresponding recess in the guiding channel between the support elements.

10. The tool according to claim 1, wherein the die cavity in its initial closed position has a side wall constituted by side walls of the movable die elements exclusively.

11. The tool according to claim 1, wherein an end stop for the respective movable die element is arranged for the movement out from the centre of the second tool-part.

12. The tool according to claim 1, wherein an end stop for said respective movable die element is arranged to stop the outward lateral movement of the respective movable die element in a position preventing the expanding sheet material in the joint to reach and contact the support elements.

* * * * *